Sept. 8, 1970     R. D. ALLEN ET AL     3,527,538
ABSORPTION, SCATTERING AND FLUORESCENCE
MEASURING METHOD AND APPARATUS
Filed Aug. 6, 1965     2 Sheets-Sheet 1
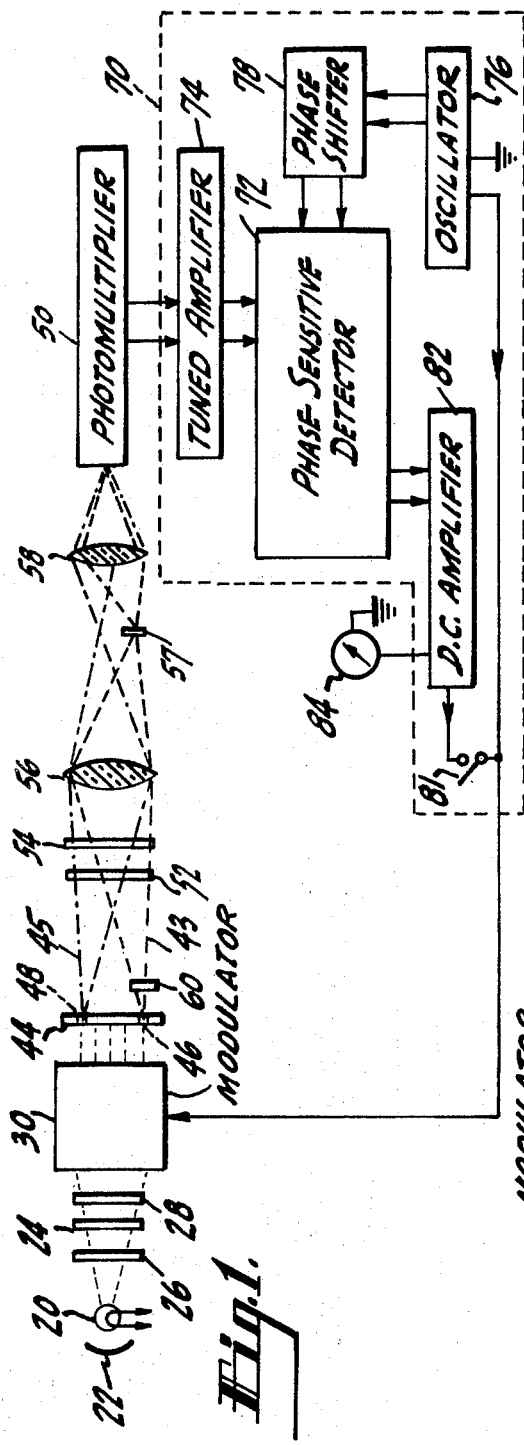
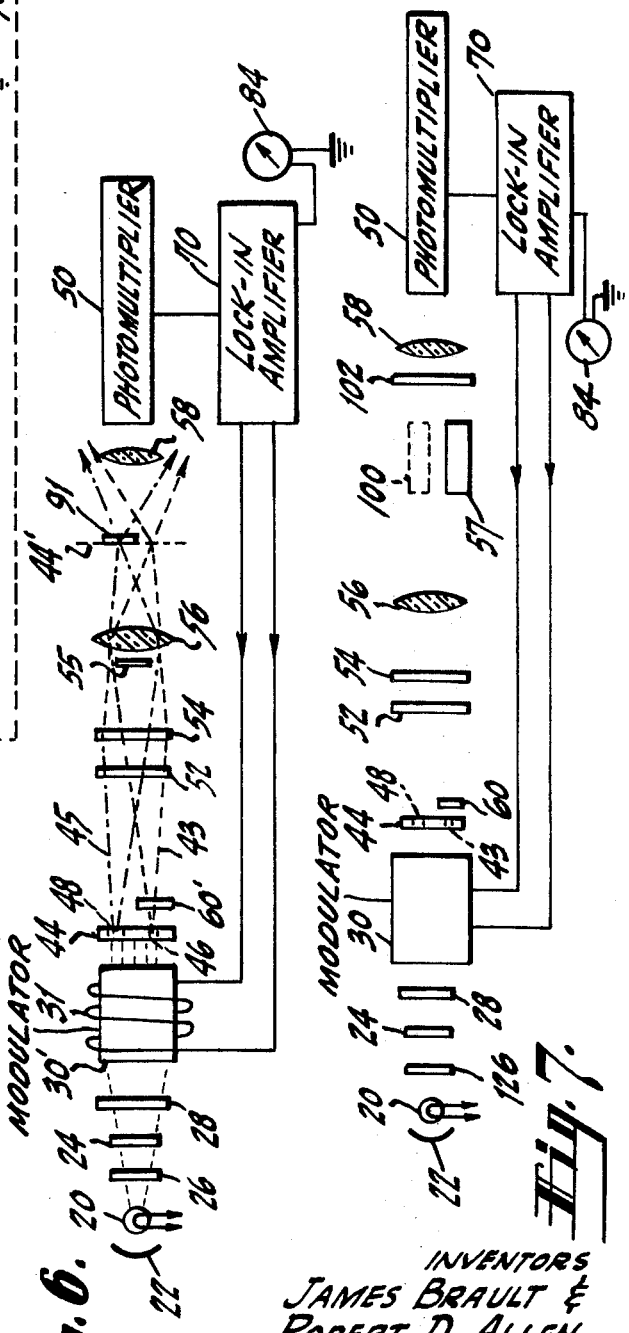
INVENTORS
JAMES BRAULT &
ROBERT D. ALLEN
BY Murray J Ellman
Attorney

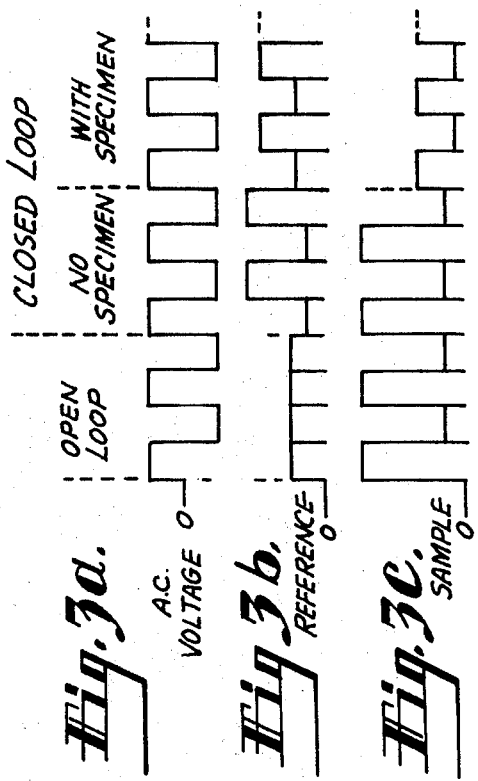
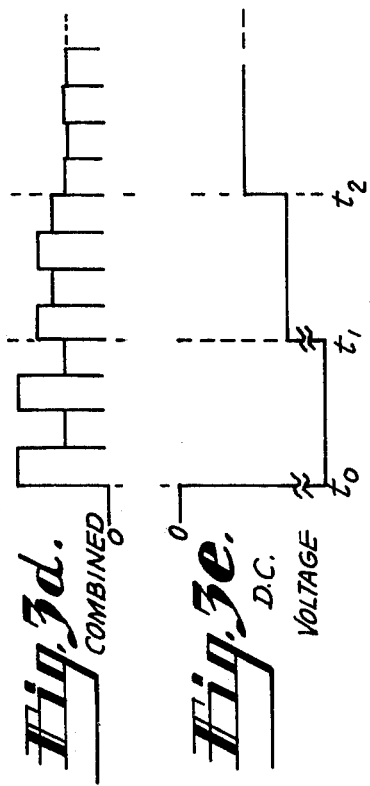
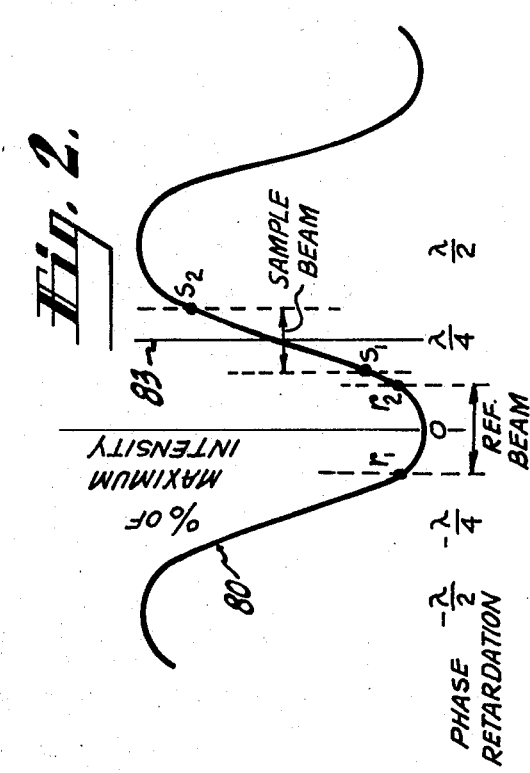
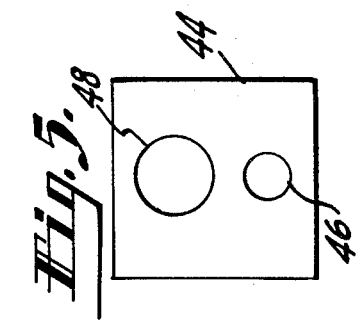
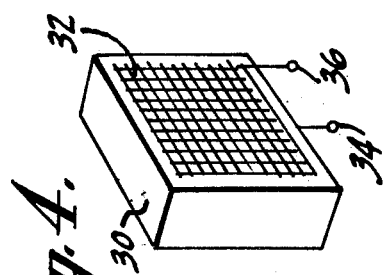
INVENTORS
JAMES BRAULT &
ROBERT D. ALLEN

United States Patent Office 3,527,538
Patented Sept. 8, 1970

3,527,538
ABSORPTION SCATTERING AND FLUORESCENCE MEASURING METHOD AND APPARATUS
Robert D. Allen, Princeton, N.J., and James Brault, Tucson, Ariz., assignors to Princeton Applied Research Corporation, Princeton Junction, N.J., a corporation of New Jersey
Filed Aug. 6, 1965, Ser. No. 477,913
Int. Cl. G01j 3/42; G01n 21/00
U.S. Cl. 356—117                                    14 Claims

ABSTRACT OF THE DISCLOSURE

A method for determining an optically determinable property of a specimen and the apparatus therefor is provided in accordance with the teachings of this invention. According to one embodiment of the invention as disclosed herein, a first beam of radiation having a first preselected state of polarization is provided along a reference path and a second beam of radiation having a second preselected state of polarization, different from said first state, is provided along a specimen path. Each of said first and second beams of radiation is then modulated to produce two different modulation patterns related to said respective states. The modulation patterns are then detected and relied upon to develop a feedback signal which is used to vary the modulation patterns until a desired relationship therebetween is obtained. In operation, the desired relationship between the two different modulation patterns is first obtained in the absence of a specimen in said specimen path, and thereafter, the desired relationship between said two different modulation patterns is re-established with a specimen present in said specimen path. The difference in the values of the feedback signals necessary to establish said desired relationship in each case being a measure of the optically determinable property of the specimen.

---

The present invention relates to the measurement of properties of a substance. More particularly, the present invention relates to a new and improved method and apparatus for measuring optical properties of a substance, such as its light absorption and scattering properties and its fluorescence.

Previous systems for the measurement of optical properties of a substance suffer from one or more of the following drawbacks: They cannot distinguish light losses due to absorption from those due to refraction and light scattering. They may be sensitive to stray light. The electronic circuitry may be complicated by the fact that the sensitivity of the photo detector changes with the optical wavelength, and this must be compensated for by the electronics or as a subsequent correction.

If a mechanically driven wedge is used in the prior art systems, the wedge, which is man-made, may be nonlinear. In such cases, the accuracy of the instrument is limited to the accuracy of the wedge. Also, since it is a mechanical device, it is slow to respond to light changes.

Accordingly, it is an object of the present invention to provide a new and improved method and apparatus for measuring the optical properties of a substance which do not suffer from the disadvantages of the prior art arrangements.

A second object of the present invention is to provide a new and improved method and apparatus which can be used for measuring light absorption, light scattering and fluorescent properties of a specimen.

A further object of the present invention is to provide a new and improved dual beam arrangement using polarized light for the measurement of optical properties of a specimen.

Still another object of the present invention is to provide a new and improved method and apparatus for measuring optical properties of a specimen which uses a closed loop servo system that automatically compensates for any changes in the system and is insensitive to variations of parameters not being measured.

With the above objects in mind, the present invention provides a method of measuring a desired optical property of a substance including the steps of producing a beam of light in a preselected state of polarization. The state of polarization of the beam of light is modulated, and the light beam is divided into a first and a second light beam. The first and second light beams travel along respectively different paths, each of the first and second light beams having respectively different modulation patterns. The specimen having the optical property to be measured is arranged so that only one of the light beams impinges thereon. Electrical signals are produced related to the intensity of a selected portion of the first and second light beams. The electrical signals are also related to the different modulation patterns of the light beams. These signals are applied to change the state of polarization of the light beams until the different modulation patterns of the first and second light beams have a preselected relationship, the degree of change necessary in the state of polarization being a measure of the desired optical property of the specimen.

An embodiment of the invention capable of practicing the method includes a source of light producing a light beam having a preselected state of polarization. A light detector is arranged to respond to light impinging thereon and produce electrical signals related to the intensity of the light. Means are provided between the light source and the detector for developing two paths of light from the source to the detector. One of the paths is the reference path and the other is the specimen path. Means are provided for producing a first modulation pattern for the light in the reference path and a second modulation pattern different from the first pattern for the light in the specimen path. Means are further provided for applying the electrical signals produced by the detector to the means for producing the modulation patterns to change the patterns so that they have a preselected relationship with respect to each other, the electrical signals being produced when a specimen is located in the specimen path and when the modulation patterns achieve their preselected relationship being a measure of the optical property of the specimen.

The novel features which are considered as characteristic for the invention are set forth in particular in the appended claims. The invention itself, however, both as to its construction and method of operation, together with additional objects and advantages thereof, will best be understood from the following description of specific embodiments when read in connection with the accompanying drawings, in which:

FIG. 1 is a diagrammatic representation of one form of apparatus embodying the invention for measuring light absorption;

FIG. 2 shows the output of the analyzer used in the apparatus of FIG. 1;

FIGS. 3a–3e are graphical representations of waveforms developed in the apparatus of FIG. 1;

FIG. 4 is a diagrammatic representation of an electro-optic light modulator used in the apparatus of FIG. 1;

FIG. 5 is a front elevation view of an aperture plate used in the apparatus of FIG. 1;

FIG. 6 is a diagrammatic representation of a second embodiment of apparatus embodying the present invention for measuring light scattering; and FIG. 7 is a diagrammatic representation of an embodiment of the present invention used for measuring fluorescence.

Referring to the drawings and more particularly to FIG. 1, a light source 20 is provided which emits light that is concentrated by a reflector 22 and directed towards a collimator 24. A filter or monochrometer 26 is shown arranged between the source 20 and the collimator 24 so that only light of a chosen wavelength or set of wavelengths may be used, if desired.

The parallel beams of light emanating from the collimator 24 impinge on a polarizer 28 which is oriented to produce plane polarized light having its electric vector in a horizontal plane (0°). The polarizer may be a sheet polarizer or a polarizing prism, for example.

The polarized beam of light from the polarizer 28 is now applied to the modulator 30 which is diagrammatically illustrated as an electro-optic light modulator (EOLM). The EOLM elliptically polarizes the linearly polarized light impinging thereon in proportion to an applied voltage by introducing phase retardations. The modulator may be a birefringement plate, the principal axes of which are set at 45 degrees to the plane of incident polarization and whose birefringence is a function of the voltage applied thereto.

Arranged next to the modulator and along the path of the modulator light output is a double aperture plate 44 which divides the main beam of light into two beams represented respectively by the dotted lines 43 and 45. The beam 43, hereinafter termed the "specimen" beam, is formed by the aperture 46 in the plate 44. The beam 45, hereinafter termed the "reference" beam, is formed by the aperture 48 in the plate 44. The intensity of each beam is determined by the size of its associated aperture and by the light flux incident at that aperture.

The reference beam 45 next passes through an analyzer 52 which is oriented with its plane of polarization at right angles to that of the polarizer 28. After leaving the analyzer, the reference beam passes through a quarter-wave plate 54 which is oriented with one of its axes at 45°. Next the the plate 54 is a lens 56 which may represent the condenser lens of a microscope, in which case the beam 45 is focused in the microscope field and passes through an objective lens 58 onto a photomultiplier 50.

Returning now to the double aperture plate 44, it can be seen that the specimen beam 43, after being formed by the aperture 46, also passes along substantially the same path between the plate 44 and the photomultiplier 50. First, however, its state of polarization is changed, that is, it is optically biased, for purposes to be explained, by a quarter-wave plate 60 which is adjacent to or in an optical plane conjugate with the plate 44. The plate 60 is oriented with one of its axes at an angle of 45 degrees to the horizontal. Note that only the specimen beam 43 and not the reference beam 45 passes through the plate 60.

Thereafter, the sample beam 43 passes through the same optical members 52 and 54 and is focused in the plane of the specimen (e.g., in the field of a microscope) by the condenser lens 56. The specimen beam also passes through a specimen holder 57 before reaching the objective lens 58 and the photomultiplier 50.

The photomultiplier 50 produces output signals proportional to the intensity of the light impinging thereon. These output electrical signals are applied to the tuned amplifier member 74 of a lock-in amplifier indicated schematically by the dotted line 70. To lock-in amplifier as shown in FIG. 1 also includes a phase-sensitive detector 72, an oscillator 76, a phase shifter 78, and a D.C. amplifier 82. Connected to the output of the D.C. amplifier 82 is a meter 84.

For purposes to be explained subsequently, the lock-in amplifier 70 applies signals to the modulator 30 and receives signals from the photomultiplier 50. The detected signals from the photomultiplier 50 are used to modify the output of the lock-in amplifier 70 applied to the modulator 30.

To understand the theory of operation of the apparatus, it must be understood that the state of polarization of a light beam includes many factors, such as its ellipticity, azimuthal angle and the direction of the polarization. One of the better ways of illustrating the state of polarization of a light beam and determining the effect thereon of different types of retarders is the Poincaré sphere. This was developed by H. Poincaré in 1892 and is explained in an article by H. G. Jerrard appearing in the Journal of the Optical Society of America, volume 44, number 8, pages 634–640 (August 1954).

By the use of this illustrative device, it is possible to determine the change in the state of polarization occurring in a polarized beam as it passes through different types of devices, such as polarizers, phase retarders, rotators, analyzers, etc.

Thus the operation of the embodiment illustrated in FIG. 1 is to divide the main beam of polarized light into two beams, a reference beam and a specimen beam. The beams pass through the optical members between the light source and the light detector following slightly different paths. The specimen beam is optically biased so as to produce a different type of electrical signal from the photodetector than that produced by the reference beam.

However, the electrical signals from the reference and specimen beams are added together and the D.C. output of the lock-in amplifier is applied to the modulator 30 which changes the state of polarization of the light beams until the produced electrical signals achieve a preselected relationship, such as being equal and opposite. The change in the output signal from the lock-in amplifier required to achieve this preselected relationship after the specimen whose optical property is to be measured is introduced into the path of the specimen beam is a measure of the optical property.

To understand clearly how the embodiment of FIG. 1 achieves the above result, the waveforms of FIGS. 2 and 3 are used. The curve 80 in FIG. 2 represents the percentage of maximum intensity of the light output from the analyzer 52, plotted along the ordinate or $y$ axis, with changes in the phase retardation produced by the modulator 30 plotted along the abcissa or $x$ axis.

The waveforms of FIGS. 3a–3e represent the electrical signals produced by the photomultiplier 50 for different stages of operation of the apparatus.

In operation, the apparatus shown in FIG. 1 is illustrated for the purpose of measuring the light absorption of a specimen. With no specimen in the specimen holder 57, the lock-in amplifier 70 is first in the open loop condition so that the switch 81 is in the illustrated or open condition. The oscillator 76, which may include a waveform shaper, applies a square wave voltage, as shown in FIG. 3a at time $t_0$, to the modulator 30.

The voltage applied to the modulator 30 changes the state of polarization of the polarized light, applied to the modulator from the polarizer 28, by introducing phase retardations in the light beam which appear in the reference and specimen light beams 45 and 43. Since the reference beam 45 is applied directly to the analyzer 52, the effect of the modulator on the output of the analyzer 52 is to vary the output of the analyzer due to this beam between the points $r1$ and $r2$ on the curve 80 of FIG. 2.

The curve 80 between these points is symmetrical about the $y$ axis and the electrical output signals produced by the photomultiplier 50 due to the reference beam 45 is represented by the waveform 3b of FIG. 3 after time $t_0$. It can be seen that waveform 3b, at this time, is substantially a series of positive pedestals as the voltage applied to the modulator varies in both the negative and positive directions. Effectively, the waveform 3b is a D.C. potential.

The phase retardations introduced in the specimen beam 43 also causes the response of the analyzer to vary.

However, it should be noted that the specimen beam 43 first passes through the quarter-wave plate 60 which provides an additional 90° retardation. Thus the axis about which the specimen beam is modulated is shifted 90° along the sine wave response curve 80 and is represented by the vertical line 83.

This portion of the response curve is substantially linear, so that the intensity of the output of the analyzer due to the modulation of the specimen beam 43 varies between the points $s1$ and $s2$ on the curve 80. The electrical signal output from the photomultiplier 50 due to the beam 43 is illustrated by the waveform 3c in FIG. 3 at time $t_0$. The larger amplitude pulse corresponds to the point $s2$ of curve 80 while the smaller amplitude pulse corresponds to the point $s1$.

Waveforms 3b and 3c would be the output signals of the photomultiplier 50 if the beams 43 and 45 occurred at separate times. Actually, since they occur simultaneously, the output of the photomultiplier 50 is the sum of the two signals. This combined wave form is shown in FIG. 3d at time $t_0$.

In order to balance the system without a specimen in the specimen holder, the switch 81 of FIG. 1 is closed. This occurs at the time $t_1$ in FIG. 3. The complete loop is now closed. The lock-in amplifier responds to the modulation patterns in the incoming signal from the photomultiplier 50. The phase-sensitive detector produces a D.C. output voltage which is proportional to the amplitude of the A.C. signal and is amplified by the amplifier 82 and applied to the modulator 30. This is shown in FIG. 3e, time $t_1$.

The D.C. voltage applied to the modulator 30 is in the sense to equalize the modulation patterns in the reference and in the specimen beams 45 and 43, 180° out-of-phase. The phase retardations produced by the D.C. signal effectively moves the vertical axes, about which the reference and specimen beams are modulated, to the left. Thus the reference beam will develop the modulation pattern shown in FIG. 3b at time $t_1$. At the same time, the specimen beam produces the modulation pattern shown at FIG. 3c. It can be seen that these patterns have the desired preselected relationship, namely, equal and opposite.

Thus, after time $t_1$, the entire system is balanced. The specimen having the optical property to be measured (in this example, absorption) is now placed in the specimen holder 57. The specimen beam now passes through all of the optical members for which the system has been balanced and through the specimen. Only the light that has passed through the specimen will now reach the photomultiplier 50 with the induced modulation pattern due to the specimen beam 43. The remaining light reaching the photomultiplier with an induced modulation pattern will be the light from the reference beam 45.

The difference in intensity in the amount of light reaching the photomultiplier 50 before and after the insertion of the specimen will be due to the light absorbed by the specimen. Thus, a new D.C. feedback signal will be produced by the D.C. amplifier 82. This is illustrated at time $t_2$ in FIG. 3e. This signal is applied to the modulator, which compensates for the insertion of the specimen and produces the equal and opposite modulation patterns shown in FIGS. 3b and 3c at time $t_2$ for the reference and specimen beams respectively.

Therefore, the difference between the reading on the output meter 84 before and after the specimen is inserted in the microscope stage is a measure of the light absorbed by the specimen.

For a complete discussion of the various features of the lock-in amplifier, an article entitled "A New Method of Polarization Microscopic Analysis" by Robert D. Allen, James Brault and Robert D. Moore, appearing in the Journal of Cell Biology, 1963, volume 18, number 2, pages 223–235, may be reviewed. Such an instrument as is manufactured by the Princeton Applied Research Corporation of Princeton, N.J., may be utilized.

The electro-optic light modulator 30 is shown in perspective in FIG. 4. As pointed out above, this modulator may be made from a crystalline material which is rendered birefringent by an applied voltage. Thus, the body of the modulator 30 in FIG. 4 may be a crystal of potassium dihydrogen phosphate having its optical $z$ axis paraxial with the optical axis of the system.

A conductive grid 32 is arranged on both major faces of the body 30. This grid may be evaporated on the surfaces of the crystal, for example. Also, the grid may be made from transparent conductive material.

The grid is connected to a terminal 36, and the grid on the opposite side of the body 30 (not shown) is attached to a second terminal 34. The output from the lock-in amplifier 70 is applied across the modulator 30 to change the amount of phase retardations introduced in the light beam by the crystal.

The modulator may also be a cubic crystal, such as $CuCl_2$, $ZnS$, hexamethylenetetramine, or potassium niobatetantalate with the electric field applied in a direction perpendicular to the direction of the light beam.

The application of the A.C. voltage to the opposing grids introduces phase retardations in the polarized light to produce the modulation pattern therein. The application of the D.C. signal then produces compensation for the difference in the first and second modulation patterns and changes the resulting patterns until they achieve their preselected relationship.

In FIG. 5 is shown, in front elevational view, the aperture plate 44 having aperture 46 for the specimen beam and aperture 48 for the reference beam. The plate 44 is a plate or disc of opaque material with the apertures 46 and 48 being spaced to form two separate, well defined beams when the main light beam impinges thereon.

The intensity of each of the formed beams is determined by the size of the aperture and the light flux incident at the aperture. The aperture 48 for the reference beam is larger than the aperture 46 for the specimen beam. Thus, small changes in D.C. bias applied to the modulator 30 will produce comparatively large changes in the resulting A.C. signal due to the reference beam. In this manner, the amount of retardation introduced in the reference beam is very small when compared to the amount of retardation introduced in the specimen beam by the quarter-wave plate 60. This is important for the apparatus to read the transmission of the sample in a highly linear fashion.

It should be apparent that there are many advantages in the operation of the embodiment described with respect to FIG. 1. The system is insensitive to large light source variations or to changes in the gain of the electronic circuits. It depends substantially only on the laws of nature and does not require any variable man-made wedge to determine its accuracy. The modulation and compensation of the light beam, as well as the measurements, are all made without moving parts and their attendant mechanical wear. Since the system responds only to the selected modulation patterns, it is not sensitive to stray light.

It should be clear that the operation of the above-described system is not necessarily limited to microscope applications. The lenses 52 and 58 need not be the condenser and objective lenses of a microscope. Rather, the beams may be otherwise focussed for use of the instrument in spectrophotometric or densitometric applications, for example.

Various elements of the arrangement shown in FIG. 1 can be repositioned without adversely affecting the operation of the apparatus. Also, some elements can be omitted and still provide a useful instrument. For example, the lens 56 could be eliminated in some applications if the collimating lens 24 is efficient enough to maintain the reference and specimen beams far enough apart in the region where the specimen is located.

In the embodiment illustrated in FIG. 1, an optical property, namely, light absorption, was measured by introducing phase retardations to effectively phase modulate the beams of polarized light with a preselected pattern. Other optical properties may be measured and other types of modulators may be used. In FIG. 6, another embodiment is illustrated. This embodiment is for the purpose of measuring the light scattering properties of a specimen.

Referring now to FIG. 6, components which are the same as those shown in FIG. 1 have been similarly numbered. A different type of modulator 30' is used, although the electro-optic light modulator 30 could also be used in this embodiment. Modulator 30' is a Faraday cell which could take the form of a container surrounded by a coil or solenoid 31 and containing a suitable homogeneous transparent material.

The modulator 30' receives linearly polarized light from the polarizer 28 at an angle of 0°. It rotates the plane of polarization through an angle determined by the voltage applied to the coil 31. When alternating current is applied to the coil 31, the plane of polarization is oscillated about a plane determined by the D.C. bias applied to the coil, resulting in angularly modulated, linearly polarized light.

Thus, instead of introducing phase retardations in the light beam, the modulator 30' rotates the plane of polarization. The light is therefore angle modulated, rather than phase modulated as in FIG. 1. In place of the quarter-wave plate 60 of FIG. 1, in this embodiment a 45° optical rotator 60' is used in the path of the specimen beam 43.

The rotator 60' optically biases the beam 43 by 45° which accomplishes a result similar to that of the quarter-wave plate 60. That is, if a curve were plotted showing the response of the analyzer 52 in terms of intensity versus optical rotation of the plane of polarization, the same curve 80 of FIG. 2 would result. Therefore, the result in operation is the same. The electrical signals produced by the photomultiplier are the waveforms shown in FIG. 3. The apparatus would therefore opertate in the manner discussed for FIG. 1 with respect to the measurement of light absorption of a sample.

However, as mentioned above, this embodiment is illustrated for the purpose of measuring light scattering. Therefore, also added to the showing of FIG. 1 is a central stop in the form of a black or opaque disc 55 in front of the condenser lens 56. The disc is arranged to prevent any light in the beams 43 or 45 from passing directly through the objective lens 58 of the microscope.

That is, the condenser lens is a dark field condenser lens having a numerical aperture which is higher than that of the objective lens. Thus, light in the beams 43 and 45 can pass only through the portion of the lens 56 which extends beyond the edge of the disc 55. Therefore, after the specimen is placed in position in the microscope field, the only light from the specimen beam that will pass through the objective lens will be the light scattered from the specimen.

The double aperture plate 44 images in the microscope field as schematically shown by the dotted line 44'. Accordingly, on the microscope slide, where the larger aperture 48 images, a light scattering standard in the form of a film 91 is placed. The film should be in the field of the microscope, less than one field diameter away from the specimen.

In operation, the film 91 is arranged in the field of the microscope with the specimen out from the position of the image of the small aperture 46. As in FIG. 1, the servo loop is closed by closing the switch 81 in the lock-in amplifier 70. The D.C. feedback voltage applied to the coil 31 of the modulator 30' biases the modulator so that the modulation patterns of the specimen and reference beams are equal and opposite, as shown in FIG. 3 after time $t_1$.

The microscope slide is then moved into position whereinin the specimen is placed directly over the image of the aperture 46 in the microscope field. The difference in the reading of the meter 84 between the initial null or balance point and the new balance point is a measure of the light scattered from the specimen.

As indicated above, an electro-optic modulator and quarter-wave plate could be used in place of the Faraday cell and 45° rotator. Similarly, the angle modulation arrangement of FIG. 6 could be used in place of the phase modulation arrangement of FIG. 1.

Thus far, the method incorporating the principles of the present inevntion has been described in terms of the transfer of light through a sample (or absorption of light by a sample, as shown in FIG. 1) and the transfer of light from one spatial direction to another (light scattering and refraction, as shown in FIG. 6). The method can also be practiced for measuring the optical properties of a sample by the transfer of light from one wavelength to another or fluorescence. Such an arrangement is shown in FIG. 7.

As before, those components which are the same as the components of FIGS. 1 and 6 are similarly numbered. In the embodiment illustarted in FIG. 7, an electro-optic light modulator 30 is used but, as mentioned hereinabove, an angle modulator may also be used. The fluorescence of the sample is determined by inserting a fluorescent standard in the reference beam and exciting both the standard and the specimen at a first wavelength. The light transmitted at a different wavelength is then measured to determine the relative fluorescence of the specimen.

For this purpose, the exciter filter 126 is arranged in FIG. 7 between the source of light 20 and the collimating lens 24. Thus, the polarizer 28 and the modulator 30 operate with light of a wavelength determined by the filter 126. A fluorescent standard 100 is arranged in the microscope field at the position where the aperature 48 of the double aperature plate 44 images. As in FIG. 1, the specimen holder 57 is arranged in the microscope field at the position of imaging of the aperture 43.

Positioned between the microscope field and the objective lens 58 is a barrier filter 102. The filter 102 is arrange to block light occurring at the exciting wavelength and allow only those wavelengths of light which occur as a result of fluorescence to be transmitted.

In operation, both the zero and reference emissions of the fluorescent standard are determined. The zero transmission is used to determine the meter zero position and is obtained by balancing the system with the standard in the reference beam position in the microscope field and nothing in the specimen holder.

The reference emission reading is obtained by balancing the system with the servo loop closed with the fluorescent standard moved into the path of the beams of light passing through both the reference and the specimen apertures in the double aperture plate. The first measurement is for establishing the meter zero position, while the second measurement is for adjusting the meter sensitivity.

After the above adjustments have been carried out, the specimen is moved into the specimen position in the microscope field and the standard into the reference position. The reading of the meter 84 when the modulation patterns have reached their preselected relationship is now a measure of the fluorescence of the sample.

It has thus been demonstrated that the method as practiced according to the principles of the present invention is useful for measuring many different optical properties of a material which can be in different forms. If desired, other optical properties of materials may be measured using different combinations of the arrangements shown in FIGS. 1, 6 and 7.

For example, the dichroism of a specimen may be measured by slightly modifying the embodiment of FIG. 1. The dichroism means the difference in the transmission for two mutually perpendicular polarizations.

This is measured in the apparatus of FIG. 1 by removing the quarter-wave plate 54 from the system and measuring the transmission while rotating the specimen. The maximum and minimum readings give the dichroism.

For calibration, an opaque specimen will provide the zero reading and a material of known dichroism is used to give a reference point. For example, a piece of Polaroid slipped over the small hole of the double aperture plate could accomplish this.

If desirable, the meter zero position of the system may be determined for the embodiments of FIGS. 1 and 6.

This is simply done by placing an opaque member in the microscope field which would cover the image of the specimen aperture of the double aperture plate 44.

While the system has been illustarted using polarized light formed by a polarizer, it would also be possible to use a laser beam or other beams that are naturally polarized. Also, instead of light radiations, other types of electromagnetic radiations may be utilized. Furthermore, analogous devices utilizing transverse acoustic waves can be used to measure analogous acoustic properties of materials.

What is claimed is:

1. A method of measuring a parameter of a specimen comprising the steps of:
   providing a first beam of radiation along a reference path, said first beam of radiation being in a first preselected state;
   providing a second beam of radiation along a specimen path, said second beam of radiation being in a second preselected state different from said first state;
   modulating said first and second beams with modulator means to produce two different modulation patterns related to said respective states;
   detecting said modulation patterns and producing signals proportional to the intensity of the beams in said patterns;
   developing a first feedback signal related to said produced signals with no specimen placed in the specimen path;
   applying said first feedback signal to said modulator means to produce a first preselected relationship between said modulation patterns;
   placing a specimen in the specimen path so that said second beam impinges on said specimen;
   detecting said modulation patterns developed with said specimen in said specimen path and developing a second feedback signal to compensate for the presence of said specimen in said specimen path; and
   applying said second feedback signal to said modulator means to produce a second preselected relationship between said modulation patterns, the differenece between said first and second feedback signals being a measure of the parameter of said specimen.

2. A method of measuring a parameter of a specimen comprising the steps of:
   providing a first beam of light along a reference path, said first beam of light having a first preselected polarized state;
   providing a second beam of light along a specimen path, said second beam of light having a second preselected polarized state different from said first state;
   modulating said first and second beams of light with modulator means to produce two different modulation patterns related to said respective states of polarization of said two light beams;
   detecting said modulation patterns and producing signals proportional to the intensity of the light in said patterns;
   developing a first feedback signal related to said produced signals with no specimen placed in the specimen path;
   applying said first feedback signal to said modulator means to produce a first preselected relationship between said modulation patterns;
   placing a specimen in the specimen path so that said second beam of light impinges on said specimen;
   detecting said modulation patterns developed with said specimen in said specimen path and developing a second feedback signal to compensate for the presence of said specimen in said specimen path; and
   applying said second feedback signal to said modulator means to produce a second preselected relationship between said modulation patterns, the difference between said first and said second feedback signals being a measure of the parameter of said specimen.

3. The method of measuring a desired optical property of a specimen comprising the steps of:
   producing a main light beam along a channel between a light source and a light detector, said main light beam having a preselected state of polarization;
   modulating the state of polarization of said main light beam with modulator means to develop a light beam having a first modulation pattern;
   dividing said light beam into first and second light beams, each of said light beams travelling along said channel in respectively different paths, said first light beam having said first modulation pattern and said second light beam having a second modulation pattern different from said first pattern;
   producing first electrical signals from the light beams reaching said light detector, said signals being a function of the intensity and modulation patterns of the light beams travelling along said channel and reaching said light detector;
   applying said first electrical signals to said modulator means to change the state of polarization of said main light beam until said first and second modulation patterns are substantially equal and opposite;
   arranging the specimen having the property to be measured in one of said paths so that only said second light beam impinges thereon;
   producing second electrical signals from the light beams reaching said light detector; and
   applying said second electrical signals to said modulator means to change the state of polarization of said main light beam until said first and second modulation patterns are again substantially equal and opposite, the difference between said first and second electrical signals being a measure of the desired optical property of said specimen.

4. Apparatus for measuring a desired optical property of a specimen, comprising, in combination:
   a source of light for producing a main beam of light and for directing said beam along a channel;
   a light detector arranged along said channel;
   polarizing means arranged along said channel between said light source and said detector for imparting a preselected state of polarization to said main light beam;
   modulating means arranged in said channel between said polarizing means and said detector for changing the state of polarization of said main light beam in accordance with electrical signals applied to said modulating means;
   means for dividing said main light beam into a first and second light beam, each of said light beams travelling along said channel in respectively different paths;
   biasing means present in one of said paths for optically biasing one of said beams;
   analyzing means arranged in said channel between said dividing means and said detector and in said paths of said first and second light beams for developing a first modulation pattern for said first light beam and a second modulation pattern for said second light beam;
   means for positioning a specimen having the optical property to be measured in said channel between said analyzing means and said detector so that only one of said first and second light beams impinges on the specimen, said light detector being responsive to said first and second light beams and producing electrical signals related to the intensity of said light beams reaching said detector and to said modulation patterns of said light beams; and means for applying said electrical signals to said modulating means to change the state of polarization of said light beams until said modulation patterns of said first and second light beams achieve a preselected relationship, the electrical signals being produced by said detector when a specimen is arranged in said specimen positioning means and said preselected relationship is achieved being a measure of said desired optical property of said specimen.

5. A method of measuring a desired optical property of a specimen, comprising the steps of:

producing a main beam of light along a directed channel;

dividing said main beam of light into first and second beams of light directed along said channel in respectively different paths;

polarizing and modulating with modulator means said first and second light beams to produce polarized first and second light beams which exhibit respectively different first and second modulation patterns;

producing electrical signals related to the intensity of those portions of said first and second polarized light beams which have travelled a preselected distance along said channel and also related to the difference between said first and second modulation patterns;

applying said electrical signals to said modulator means to change said first and second modulation patterns until said patterns have a preselected relationship with respect to each other, the electrical signals being produced at this time being first balancing signals;

inserting the specimen having the property to be measured in one of said paths of said channel so that only one of said first and second light beams impinges thereon; and applying the electrical signals produced after the insertion of said specimen to said modulator means to change said first and second modulation patterns until said preselected relationship between said first and second modulation patterns is again reached, the electrical signals being produced at this time being second balancing signals, the difference between said first balancing signals and said second balancing signals being a measure of said optical property of said specimen.

6. Apparatus for measuring a desired optical property of a specimen, comprising, in combination:

a light source for producing a main beam of light directed along a channel;

a light detector arranged along said channel for producing electrical signals related to light reaching said detector;

polarizing means arranged along said channel between said light source and said detector for imparting a preselected state of polarization to said light beam;

a modulator arranged in said channel between said polarizing means and said detector for changing the state of polarization of said main light beam in accordance with electrical signals applied thereto;

a double aperture plate arranged in said channel between said modulator and said detector for dividing said main light beam into first and second light beams, each of said first and second light beams travelling along said channel in respectively different paths;

a quarter-wave plate arranged in one of said paths of said light beams between said double aperture plate and said detector for changing the state of polarization of one of said first and second light beams;

an analyzer arranged in said channel between said quarter-wave plate and said detector so that both of said first and second light beams pass therethrough, said analyzer cooperating with said modulator and said quarter-wave plate so that said first and second light beams occur with different modulation patterns;

means for positioning a specimen in the path of one of said first and second light beams so that only one of said beams impinges thereon, the electrical signals produced by said detector being a function of the intensity of the light beams reaching said detector and the relationship between said modulation patterns; and means for applying said electrical signals produced by said detector to said modulator for changing the state of polarization of said main light beam until said modulation patterns at which said first and second light beams occur have a preselected relationship said electrical signals being produced by said detector when a specimen is arranged in said specimen positioning means and said preselected relationship occurs being a measure of said desired property of said specimen.

7. Apparatus as claimed in claim 6 wherein said modulator is a Faraday cell.

8. Apparatus as claimed in claim 6 wherein said modulator is an electro-optical modulator.

9. Apparatus as claimed in claim 8 wherein said electro-optical modulator is a KDP modulator.

10. Apparatus as claimed in claim 6 wherein the apertures of said double aperture plate are of substantially different sizes.

11. A method for measuring the optical density of a specimen comprising the steps of:

providing a first beam of light in a reference path, said first beam of light having a first preselected polarized state;

providing a second beam of light in a specimen path, said second beam of light having a second preselected polarized state different from said first state;

modulating said first and second beams of light with modulator means to produce two different modulation patterns related to said respective states of polarization of the two light beams;

detecting said modulation patterns and producing signals poroportional to the intensity of light in said patterns;

developing a first feedback signal related to said produced signals with no specimen in the specimen path;

applying said first feedback signal to said modulator means to produce a first preselected relationship between said modulation patterns;

placing a specimen in the specimen path so that said second beam of light impinges on said specimen and said specimen absorbs a portion of said second beam and transmits a portion thereof;

detecting said portion of said second beam transmitted through said specimen and its modulation pattern and developing a second feedback signal to compensate for the presence of said specimen in said specimen path; and applying said second feedback signal to said modulator means to produce a second preselected relationship between said modulation patterns, the difference between said first and said second feedback signals being a measure of the optical density of said specimen.

12. Apparatus for measuring the fluorescence of a specimen, comprising, in combination:

a source of light for producing a main beam of light having a selected wavelength and for directing said beam along a channel;

a light detector arranged along said channel;

polarizing means arranged along said channel between said light source and said detector for imparting a preselected state of polarization to said main light beam;

modulating means arranged in said channel between said polarizing means and said detector for changing the state of polarization of said main light beam in accordance with electrical signals applied to said modulating means;

means for dividing said main light beam into a first and second light beam, each of said light beams travelling along said channel in respectively different paths;

biasing means present in one of said paths for optically biasing one of said beams;

analyzing means arranged in said channel between said dividing means and said detector and in said paths of said first and second light beams for developing a first modulation pattern for said first light beam and a second modulation pattern for said second light beam;

means for positioning a specimen in said channel between said analyzing means and said detector so that only one of said first and second light beams impinges on the specimen, said light detector being responsive substantially only to light beams having wavelengths different from said selected wavelengths and producing electrical signals related to the intensity of said light beams reaching said detector and to said modulation patterns of said light beams; and means for applying said electrical signals to said modulating means to change the state of polarization of said light beams until said modulation patterns of said first and second light beams achieve a preselected relationship, the electrical signals being produced by said detector when a specimen is arranged in said specimen positioning means and said preselected relationship is achieved being a measure of the fluorescence of said specimen.

13. Means for measuring light scattering properties of a specimen, comprising, in combination:

a light source;

means for developing two beams of light from said source, one of said beams being a reference beam and the other the specimen beam;

means for producing a first modulation pattern for the light in said reference beam;

means for producing a second modulation pattern different from said first pattern for said light in said specimen beam;

light detector means for responding to light impinging thereon and to the modulation patterns of said light and for producing electrical signals related to said light and patterns;

means for preventing light in said reference and specimen beams from reaching said detector directly;

a scattering light standard positioned in said reference beam, and means for positioning a specimen in said specimen beam, said detector thereby responding substantially only to light scattered from said standard and from the specimen; and means responsive to said electrical signals for producing a feedback signal to change said first modulation pattern into a pattern equal and opposite to said second modulation pattern, said feedback signal being a measure of the light scattering properties of the specimen.

14. Means for measuring optical properties of a specimen with a microscope having a light source, a condenser lens, an objective lens and a specimen holder arranged between the lenses, comprising, in combination:

means for developing two polarized beams of light from the light source, one of said beams being a reference beam and the other a specimen beam;

means for producing a first modulation pattern for the light in said reference beam;

means for producing a second modulation pattern different from said first pattern for said light in said specimen beam, said means for producing a second modulation pattern including means to optically bias said specimen beam;

a light detector arranged to be responsive to light emerging from the objective lens of the microscope, the light beams travelling from the light source through the condenser and objective lenses of the microscope to the detector, only the light in said specimen beam impinging on the specimen holder of the microscope, said light detector producing electrical signals related to the intensity and modulation patterns of the light beams impinging on said detector; and means for applying said electrical signals to said means for producing modulation patterns to change the state of polarization of said light beams until said modulation patterns of said first and second light beams achieve a preselected relationship, the electrical signals being produced by said detector when a specimen is arranged in the specimen holder and said preselected relationship is achieved being a measure of the desired optical property of the specimen.

References Cited

UNITED STATES PATENTS

| | | | |
|---|---|---|---|
| 2,438,422 | 3/1948 | Stearns et al. | |
| 2,439,373 | 4/1948 | Sterns | 250—204 |
| 2,601,327 | 6/1952 | Rose | 250—204 |
| 2,933,972 | 4/1960 | Wenking. | |
| 3,146,294 | 8/1964 | Koesterl et al. | |
| 3,200,698 | 8/1965 | Froome et al. | 350—150 X |
| 3,342,099 | 9/1967 | Kaye. | |
| 3,361,027 | 1/1968 | Kaye. | |

RONALD L. WIBERT, Primary Examiner

F. L. EVANS, Assistant Examiner

U.S. Cl. X.R.

250—71.5; 356—89, 104, 205